US008388299B2

(12) United States Patent
Ramsey

(10) Patent No.: US 8,388,299 B2
(45) Date of Patent: Mar. 5, 2013

(54) SYSTEMS AND METHODS TO PRODUCE AND SEQUENCE A PLURALITY OF DIFFERENT BOOKS

(75) Inventor: Thomas Eugene Ramsey, Boiling Springs, SC (US)

(73) Assignee: R. R. Donnelley & Sons Company, Chicago, IL (US)

( * ) Notice: Subject to any disclaimer, the term of this patent is extended or adjusted under 35 U.S.C. 154(b) by 1027 days.

(21) Appl. No.: 12/105,940

(22) Filed: Apr. 18, 2008

(65) Prior Publication Data

US 2009/0263226 A1 Oct. 22, 2009

(51) Int. Cl.
*B65G 57/00* (2006.01)
*B42C 9/00* (2006.01)
*B65H 33/04* (2006.01)

(52) U.S. Cl. ........... 414/788.1; 412/1; 412/9; 270/58.01

(58) Field of Classification Search ........................ None
See application file for complete search history.

(56) References Cited

U.S. PATENT DOCUMENTS

| | | | | |
|---|---|---|---|---|
| 3,982,743 | A * | 9/1976 | DeRoo, Sr. | 270/1.01 |
| 4,519,599 | A | 5/1985 | Mayer | |
| 4,601,462 | A | 7/1986 | Bowman | |
| RE32,690 | E | 6/1988 | Wong | |
| 4,984,948 | A * | 1/1991 | Lindsay et al. | 412/1 |
| 5,028,192 | A * | 7/1991 | Lindsay et al. | 412/1 |
| 5,067,697 | A | 11/1991 | Honegger | |
| 5,287,976 | A * | 2/1994 | Mayer et al. | 209/547 |
| 5,772,195 | A | 6/1998 | Mueller | |
| 6,095,740 | A * | 8/2000 | Hollenstein et al. | 412/4 |
| 6,193,458 | B1 * | 2/2001 | Marsh | 412/1 |
| 6,443,682 | B2 * | 9/2002 | Marsh | 412/16 |
| 6,857,796 | B2 | 2/2005 | Hatayama | |
| 6,970,541 | B2 * | 11/2005 | Bates et al. | 379/114.15 |
| 6,986,630 | B2 * | 1/2006 | Marsh | 412/1 |
| 7,014,182 | B2 * | 3/2006 | Marsh | 270/58.07 |
| 7,133,851 | B1 * | 11/2006 | Benson | 705/410 |
| 7,221,196 | B2 | 5/2007 | Shirani | |
| 7,236,934 | B1 | 6/2007 | Mayes | |
| 7,246,798 | B2 | 7/2007 | Graushar et al. | |
| 7,694,947 | B2 * | 4/2010 | Marsh | 270/58.07 |
| 2001/0010793 | A1 * | 8/2001 | Marsh | 412/16 |
| 2002/0061238 | A1 * | 5/2002 | Marsh | 412/9 |
| 2003/0026401 | A1 * | 2/2003 | Bates et al. | 379/114.15 |
| 2004/0046303 | A1 * | 3/2004 | Stolz | 270/1.01 |
| 2006/0140743 | A1 * | 6/2006 | Marsh | 412/25 |
| 2007/0179037 | A1 * | 8/2007 | Dobrovolsky | 493/480 |
| 2010/0266368 | A1 * | 10/2010 | Marsh | 412/16 |

* cited by examiner

*Primary Examiner* — Mussa A Shaawat
(74) *Attorney, Agent, or Firm* — Hanley, Flight & Zimmerman, LLC

(57) ABSTRACT

Systems and methods are described to produce and sequence a plurality of different books. An example system includes a plurality of signature feeders to deliver signatures to stations along a conveyor to simultaneously produce and sequence a plurality of different books in a first predetermined order to co-mail, wherein each of the different books has different content. Additionally, the example system includes one or more trimmers to trim the plurality of different books. Further, the example system includes a stacker to stack the plurality of different books in a second predetermined order, wherein the second predetermined order satisfies discount postage rate guidelines. Still further, the example system includes a controller to cause the plurality of different books to be produced in a first predetermined order.

31 Claims, 7 Drawing Sheets

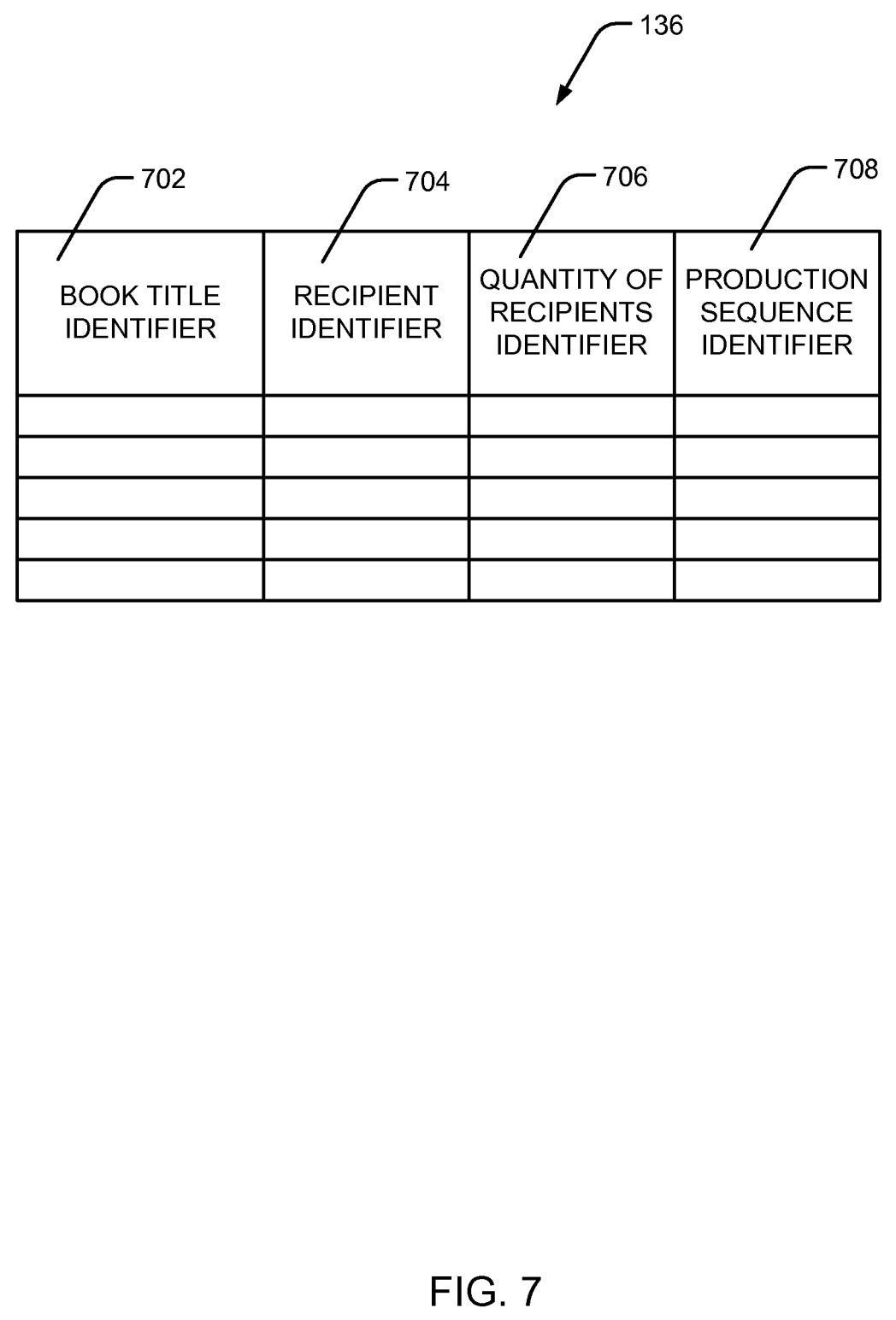

136

| 702<br>BOOK TITLE IDENTIFIER | 704<br>RECIPIENT IDENTIFIER | 706<br>QUANTITY OF RECIPIENTS IDENTIFIER | 708<br>PRODUCTION SEQUENCE IDENTIFIER |
|---|---|---|---|
| | | | |
| | | | |
| | | | |
| | | | |
| | | | |

FIG. 7

SYSTEMS AND METHODS TO PRODUCE AND SEQUENCE A PLURALITY OF DIFFERENT BOOKS

FIELD OF THE DISCLOSURE

This disclosure relates generally to binding lines and, more particularly, to systems and methods to produce and sequence a plurality of different books.

BACKGROUND

Postal services may give postal rate discounts to individuals and/or companies that presort mail to a particular presort level. Each presort level has a different postage rate. The cost of postage may decrease depending on the number of pieces of mail presorted and/or the presort level achieved. A plurality of different publications can be bundled together to increase the number of publications that qualify for a lower postage presort rate. Historically, publications that were co-mailed had to have approximately the same trim size and could not vary greatly in thickness.

A wide variety of systems are available for presorting mail. In some examples, a first bindery produces a plurality of first publications and a second bindery, that may be located in a different facility, produces a plurality of second publications. The first publications and the second publications are then transported by truck to a co-mailing facility. The different publications are unloaded and placed onto conveyors that merge to create a common mail stream and, thus, merge the first publications with the second publications. In some instances, the different publications are transferred onto the common mail stream in an order that corresponds to a mail carrier route order and/or an order that will satisfy postal discounts.

One known system for combined mailing of a plurality of diverse publications is described in U.S. Pat. No. 7,133,851. The described system includes a first bindery and a second bindery that produces a plurality of first publications and a plurality of second publications, respectively. The first publications and the second publications may have size restrictions such as, a maximum height, a maximum length, a maximum width, and a maximum weight. The described system also includes a co-mailer that merges a stream of first publications with a stream of second publications into a unique order to send the different publications to different recipients at more favorable mail rate. However, the described system, as well as many other known systems, requires multiple binderies to simultaneously produce different publications to co-mail.

BRIEF DESCRIPTION OF THE DRAWINGS

FIG. 7 is an example reference database that may be used in the example process of FIG. 5.

DETAILED DESCRIPTION

Figure 1:
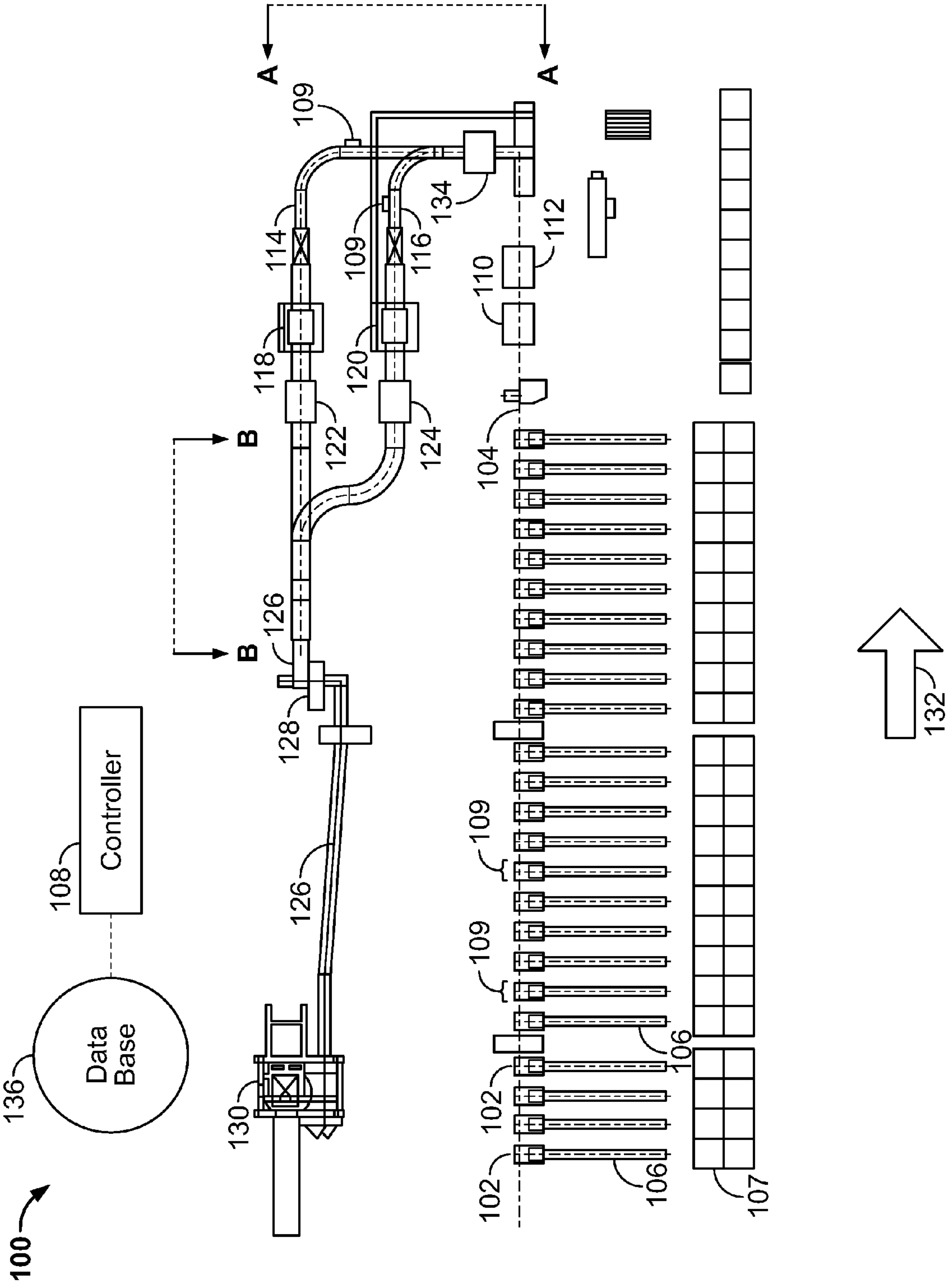
FIG. 1 is a schematic illustration of an example binding line.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example methods and apparatus described herein can be used to simultaneously produce and sequence a plurality of different books, which includes all types of bound printed matter such as, for example, magazines, catalogs, brochures, flyer, circulars, hardcover books, paper backs or any other publications, in a predetermined order to co-mail. In particular, the methods and apparatus described herein can be used to identify the book titles and the number of different books distributed in a geographic area. Additionally, the methods and apparatus described herein can be used to identify the addresses of the recipients of the different books. Further, the methods and apparatus described herein can be used to prepare a first predetermined order to produce the different books in a single mailstream to maximize the number of books that qualify for a postage rate discount. Still further, the methods and apparatus described herein can be used to change the predetermined order to a second predetermined order if, for example, a book is identified as defective and is re-ordered and, thus, changes the order in which the books are produced.

In some examples, the system includes a controller that causes a plurality of signature feeders to deliver a plurality of signatures to stations along a conveyor to produce different books in a predetermined order. Additionally, the system may include a rejecter that rejects books that have been determined to be defective. If a book is rejected, the controller can re-order a proper copy of the defective book, i.e., a replacement book. Re-ordering the book causes the plurality of signature feeders to deliver signatures along the conveyor to reproduce a proper copy of the book to replace the defective book. Additionally, re-ordering the proper replacement copy of the defective book causes the predetermined order to change to a second predetermined order to accommodate the production of the replacement book. The second predetermined order substantially corresponds to an order that maximizes the number of books that qualify for a lower postage presort level.

In some examples, the system may be able to produce a plurality of different books that are different sizes, such as, different shapes, thicknesses, heights, or widths. The plurality of different books may be separated according to size and fed toward one of a plurality of trimmers which, are calibrated to trim the different size books. The plurality of trimmers are positioned along conveyors. For example, where there are two trimmers, the first trimmer and the second trimmer are positioned on a first trimmer conveyor and a second trimmer conveyor, respectively. After the plurality of different books are trimmed, the different size books are merged into a single mail stream in an order that substantially corresponds to the first predetermined order and/or the second predetermined order. The plurality of different books then move toward a stacker to stack the plurality of different books and package them for mailing.

In some examples, a first book may be a magazine that is heavily subscribed to in a geographic area and a second book may be a magazine that is not heavily subscribed to (e.g., has a small-circulation) relative to the first book. Due to the low number of subscriptions for the second book in the geographic area, the second book alone may not be able to qualify for the lower postage presort level. However, by co-mailing the first book with the second book, both the first book and the second book may qualify for the lower postage presort level. In alternative examples, multiple books that are small-circulation magazines that do not individually qualify for the lower presort level may be co-mailed with each other and, thus, a combination of different small circulation magazines may qualify for the lower presort level.

As illustrated in the example of FIG. 1, an example binding system 100 includes a plurality signature feeders 102 that are positioned near or at a conveyor 104, which maybe, for example, a conveyor chain. Any number of signature feeders 102 may be used and/or may be positioned in any suitable position relative to the conveyor 104. Further, the plurality of the signature feeders 102 are coupled to a plurality of hoppers 106 that may hold a plurality of signatures (not shown) to be fed to the signature feeders 102. Additionally, at least one of the hoppers 106 may be coupled to at least one additional hopper 107 positioned substantially perpendicular to, parallel to, behind, or otherwise adjacent to the plurality of hoppers 106. The additional hopper 107 may decrease the amount of time needed to reload the hoppers 106 with signatures and/or may increase the amount of signatures (e.g., the signature capacity) that each of the hoppers 106 may hold. In another example, if an additional hopper 107 is coupled to at least one of the hoppers 106 (e.g., two additional hoppers 107 are coupled to the hopper 106), each of the signature feeders 102 may be able to feed a plurality of different signatures onto the conveyor when, for example, the first additional hopper 107 has signatures associated with a first book and the second additional hopper 107 has signatures associated with a second book.

In this example, a controller 108 is communicatively coupled to the plurality of signature feeders 102 and may be communicatively coupled to any other device within the example bindery system 100. As discussed in more detail below in connection with FIGS. 4 and 5, the controller 108 determines a first predetermined order and/or a second predetermined order to deliver signatures to stations 109 along the conveyor 104. The first and second predetermined orders are based, at least in part, on recipient data (e.g., recipient addresses) of the recipients of the books. To store the recipient data for use in subsequently determining the first or second predetermined orders, the controller 102 may store the recipient data or may be communicatively coupled to a reference database 136.

As shown in FIG. 7, the example reference data base 136 is configured or structured to store data from a plurality of mail files containing recipient data for one or more books and the production sequence. In the illustrated example of FIG. 7, the reference data base 136 includes data related to a book title identifier 702, a recipient identifier 704, a quantity of recipients identifier 706, and a production sequence identifier 708. The book title identifier data 702 may be used to store book titles or other identifiers of books that may be produced on the binding system 100. The recipient identifier data 704 may be used to store the names and addresses of the recipients of the books. The production sequence identifier 708 may be used to store a list of recipients of a first book and the second book that may correspond to the first predetermined order and/or the second predetermined order. Though the illustrated example data base 136 includes four types of data, additional information may be included in the data base 136 to store additional data such as, for example, a defective book identifier or any other data.

Turning back to the example illustrated in FIG. 1, near the plurality of signature feeders 102, the conveyor 104 moves the stations 109 in a direction generally indicated by arrow 132. As the stations 109 move in proximity to the front of the plurality of signature feeders 102, the signature feeders 102 may deliver a signature onto one or more of the stations 109. As more signature feeders 102 add signatures to a station 109, the plurality of different signatures become stacked on a station 109, and the last signature added may correspond to a front and/or rear cover page of a book. The signatures stacked at each station 109 may correspond to different books. For example, signatures that correspond to a first book may be delivered to a first station 109 and signatures that correspond to a second book may be delivered to a second station 109. Additionally, the first book may be a first size (e.g., 100 pages) and the second book may be a second size (e.g., 200 pages). Furthermore, the first book may have different dimensions or sizes (e.g., height, width and/or thickness) than the second book. The signatures may be any size such as, large formats or table-sized books. Additionally, any particular book at one of the stations 109 may have the same or different content than another book at another one of the stations, even if the books have the same title.

In this example, the bindery system 100 includes a stitcher 110 that stitches the plurality of signatures together to bind the signatures to produce a book. In the illustrated example, the stitcher 110 is positioned between the signature feeders 102 and a rejecter 112. However, in other examples, the stitcher 110 may be positioned elsewhere along the bindery line 100. Furthermore, the stitcher 110 may create any type of suitable stitch on the book, such as, a square back stitch or a saddle stitch.

In this example, the rejecter 112 identifies if a book meets predetermined criteria and/or if a book is defective. In some examples, a book may be defective for having the wrong number of signatures (e.g., too many or too few), misaligned signatures, or one or more wrong signatures. As discussed in more detail in connection with FIGS. 4 and 5, if a book is defective, a replacement book may be reordered via the controller 108 at any time so that the replacement book may be grouped with other books to receive a lower postage presort level. The reordered replacement book may be included in a bundle (e.g., package) of other books with the same carrier route number, the same five digit postal code mailing address, the same first three digits of the postal code mailing address, or the same state or provincial mailing address. In some examples, if a book is reordered, the controller 108 changes the first predetermined order to a different order (e.g., a second predetermined order) to accommodate re-producing the defective book. In this example, the first predetermined order and the second predetermined order are different, however, in other examples they may be the same or similar. Additionally, the controller 108 may cause the plurality of signature feeders 102 to leave a station 109 empty to, for example, ensure that the second predetermined order is achieved, as described in greater detail below.

In the illustrated example of FIG. 1, after the books have been stitched, the conveyor 104 (e.g., a single mail stream) is diverted into two streams via a first trimmer conveyor 114 and a second trimmer conveyor 116. The plurality of books are diverted by the diverter 134 to one of the two streams or conveyors 114 or 116 for any suitable reason, such as, for example, to divert a first size book to the first trimmer conveyor 114 and a second size book to the second trimmer conveyor 116 and/or to increase the throughput of the bindery system 100.

In this example, the plurality of different books are delivered to stations 109 on the first trimmer conveyor 114 and the second trimmer conveyor 116 that may be the same or different than the stations 109. In any case, the stations 109 provide the same function of moving the books through the bindery system 100 and, thus, the same reference number will be used in this description. In some examples, all of the stations 109 on both the first trimmer conveyor 114 and the second trimmer conveyor 116 may have a book on them. Alternatively, some stations 109 may be left empty, i.e., with no book on them. The first trimmer conveyor 114 leads to a first trimmer 118 and the second trimmer conveyor 116 leads to a second trimmer 120. The first trimmer 118 and/or the second trimmer 120 include a plurality of cutters (e.g., blades, edges) that are adjusted to cut at least one of the edges of the different books so that all of the pages of the respective books have substantially the same dimensions and/or are flush with one another. The first trimmer 118 is adjusted to trim a first trim size and the second trimmer 120 is adjusted to trim a second trim size. The first and second trim sizes may be different or substantially the same. Furthermore, in alternative examples, any number of trimmer conveyors (e.g., 1, 3, 4) and any number of trimmers (e.g., 1, 3, 4, etc.) may be used.

The bindery system 100 also includes a first inkjet addresser 122 and a second inkjet addresser 124 associated with the first trimmer 118 and the second trimmer 120, respectively. The first and second inkjet addressers 122 and 124 customize and/or personalize the plurality of different books by, for example, addressing the books with the intended recipient's name and/or address. The ink jet addressers 122 and 124 address the cover of the book and/or at least one of the signatures within the book. In alternative examples, the inkjet addressers 122 and 124 may be located at another site on bindery system 100.

Additionally, to further personalize the different books, the bindery system 100 may include a plurality of baggers (not shown) that may place a polybag around each of the plurality of different books. The polybag may be used to protect the book from the elements (e.g., snow, rain, sleet, etc.), to include items in addition to the book, such as, for example a trading card, a poster, a video game, a CD, or any other type of insert made of any suitable material, and/or to hide the title of the book for privacy reasons. Additionally, in some examples, the bagger(s) may identify a first book and place a polybag on the first book and/or identify a second book and place a different polybag on the second book. For example, some polybags may include graphics and/or advertisements on a surface of the polybag that may be associated with a particular book.

In this example, as discussed in more detail in connection with FIGS. 2 and 3, after the plurality of different books are trimmed, the first trimmer conveyor 114 and the second trimmer conveyor 116 merge to a single mail stream on a third conveyor 126. The third conveyor 126 leads to a stacker 128, which sorts and/or packages the plurality of different books. The order in which the stacker 128 places the different books may be an order that is the same as the first predetermined order, the second predetermined order or any other suitable order. The stacker 128 (e.g., a backend stacker) groups the plurality of different books into packages (e.g., bundles) that have the same presort level. Further, any number of stackers (e.g., 2, 3, etc.) may be used. In this example, after the plurality of different books are packaged, the packages may move along the third conveyor 126 to a palletizer 130, which places the different packages onto pallets for shipment.

Figure 2:
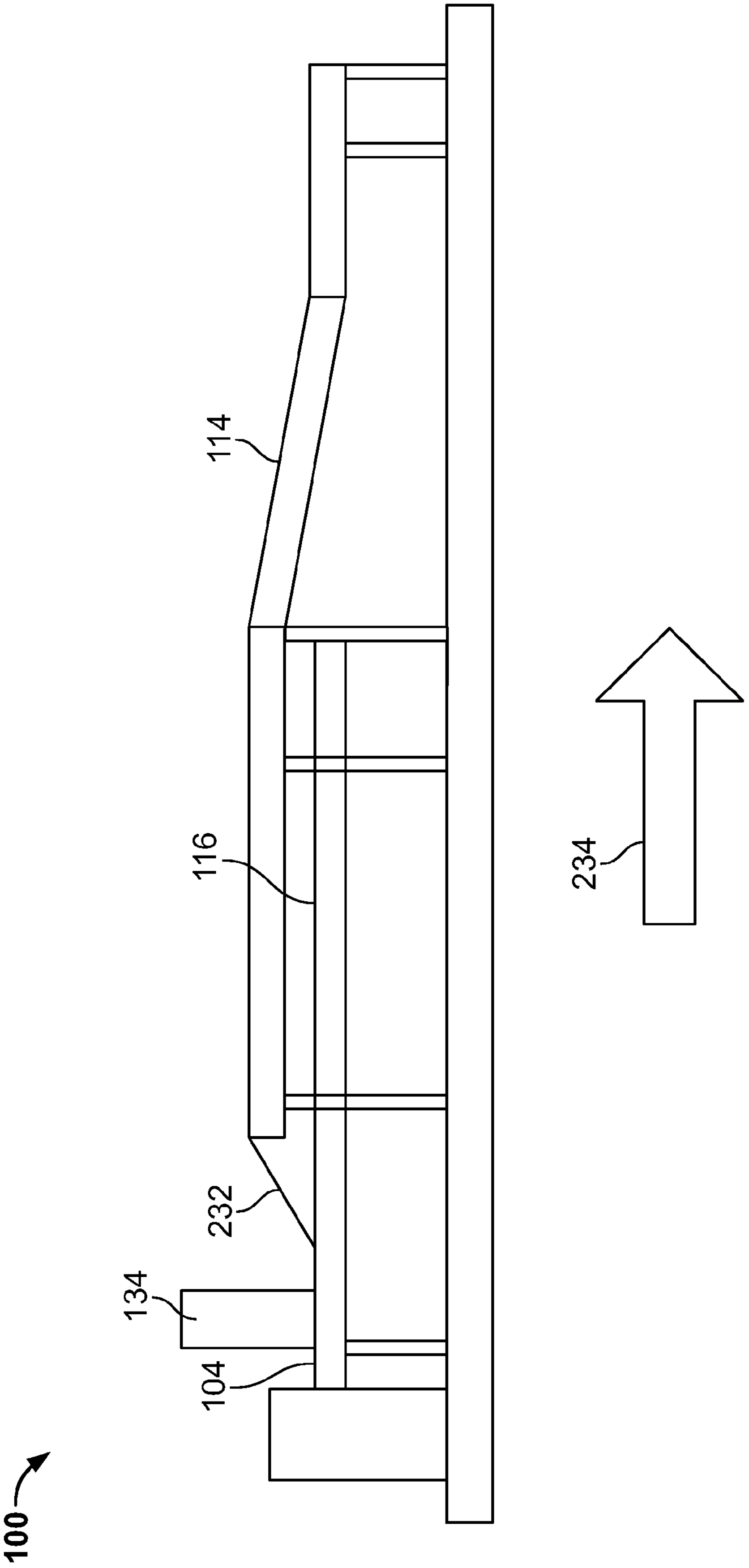
FIG. 2 is a side view of a portion of the example binding line of FIG. 1 corresponding to lines A-A of FIG. 1.

FIG. 2 is a side view of a portion of the bindery system 100 corresponding to lines A-A of FIG. 1. FIG. 2 depicts the relationship between the conveyor 104, an example diversion section 232, the first trimmer conveyor 114, the second trimmer conveyor 116, and the diverter 134. As described above, in some examples, books of a first trim size proceed on the diversion section 232 to the first trimmer conveyor 114 and books of a second trim size proceed to the second trimmer conveyor 116. Each of the first and second trimmer conveyors 114 and 116 move in direction generally indicated by arrow 234. In other examples, the diverter 134, the first trimmer conveyor 114, and the second trimmer conveyor 116 may be placed in any other suitable arrangement, such as, for example, the first and second trimmer conveyors 114 and 116 may be substantially side by side.

Figure 3:
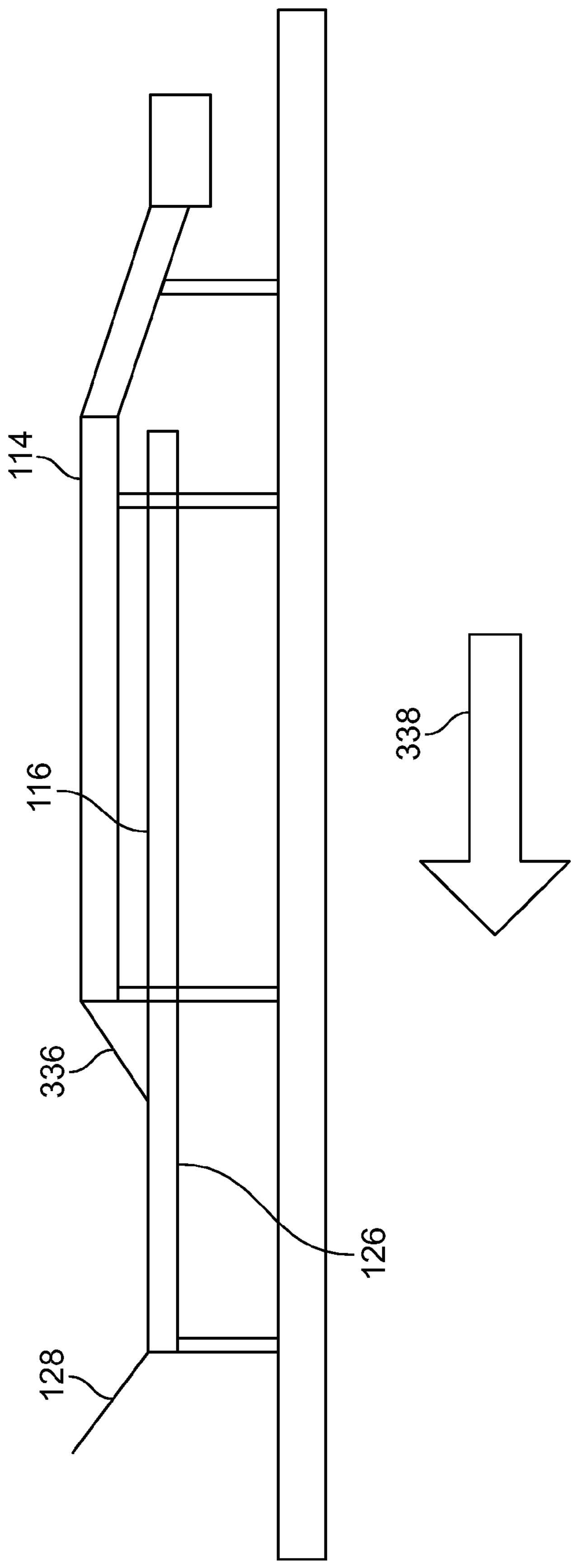
FIG. 3 is a side view of a portion of the example binding line of FIG. 1 corresponding to lines B-B of FIG. 1.

FIG. 3 is a side view of a portion of the bindery system 100 corresponding to lines B-B of FIG. 1. FIG. 3 depicts the relationship between the first trimmer conveyor 114, the second trimmer conveyor 116, an example merge section 336, the third conveyor 126 and the stacker 128. In some examples, books from the first trimmer conveyor 114 proceed on the merge section 336 in a direction generally indicated by arrow 338 to be merged with books on the second trimmer conveyor 116. The order that the books enter the third conveyor 126 may be the same as the first predetermined order, the second predetermined order or any other suitable order. Each of the first and second trimmer conveyors 114 and 116 and the third conveyor 126 move in direction generally indicated by the arrow 338. In other examples, the merge section 336, the first trimmer conveyor 114, and the second trimmer conveyor 116 may be placed in any suitable arrangement, such as, for example, the first and second trimmers 114 and 116 may be substantially side by side.

Figure 4:
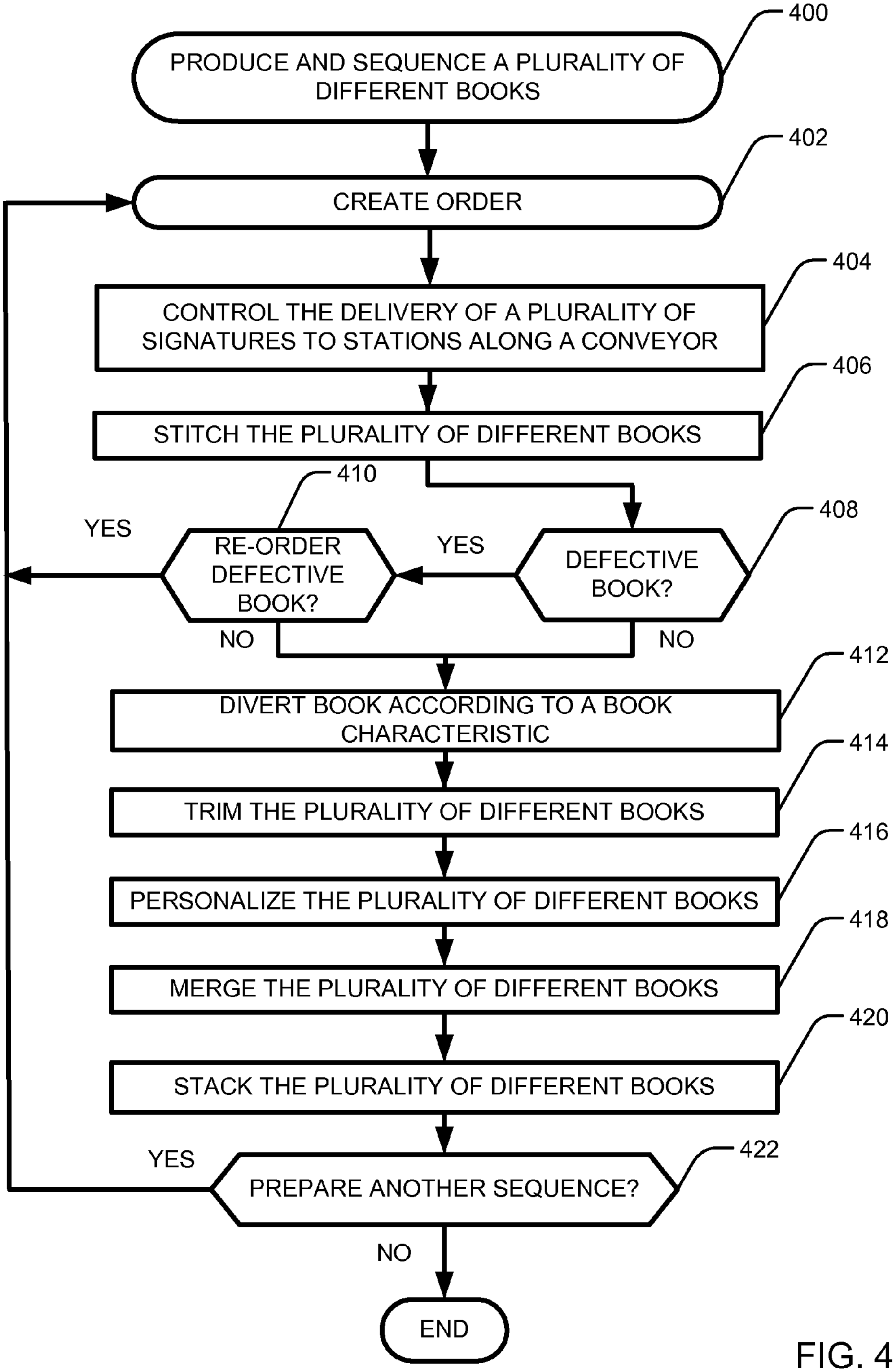
FIG. 4 is a flow diagram of an example process to produce and sequence a plurality of different books.
Figure 5:
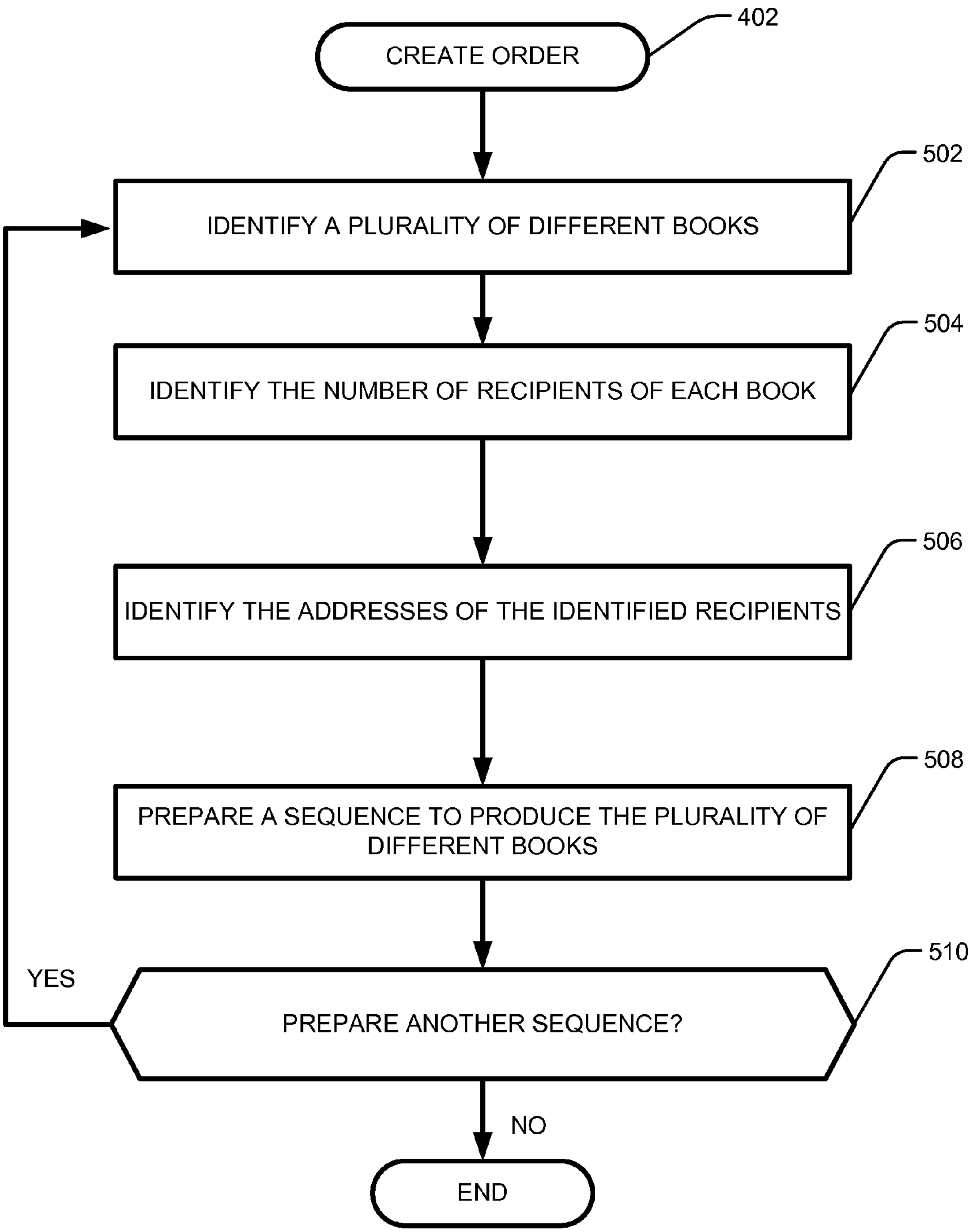
FIG. 5 is a flow diagram of an example process to create an order used in the example process of FIG. 4.

FIGS. 4 and 5 are flow diagrams of example processes that can be used to produce and sequence the production of a plurality of different books. The example processes of FIGS. 4 and 5 may be used to implement the example bindery system 100 of FIG. 1. In some examples, the flow diagrams can be representative of example machine readable instructions and the example methods of the flow diagrams may be implemented entirely or in part by executing the machine readable instructions. Such machine readable instructions may be executed by the example controller 108 (FIG. 1). In particular, a processor or any other suitable device to execute machine readable instructions may retrieve such instructions from a memory device (e.g., a random access memory (RAM), a read only memory (ROM), etc.) and execute those instructions. In some examples, one or more operations depicted in the flow diagrams of FIGS. 4 and 5 may be implemented manually.

While an example manner of implementing the bindery system 100 of FIG. 1 has been illustrated in FIGS. 4 and 5, one or more of the elements, processes and/or devices illustrated in FIGS. 4 and 5 may be combined, divided, re-arranged, omitted, eliminated and/or implemented in any other way. Any of the operations of the example processes described in FIGS. 4 and 5 may be implemented by hardware, software, firmware and/or any combination of hardware, software and/or firmware, including, for example, by one or more circuit (s), programmable processor(s), application specific integrated circuit(s) (ASIC(s)), programmable logic device(s) (PLD(s)) and/or field programmable logic device(s) (FPLD (s)), etc. When any of the appended claims are read to cover a purely software implementation the operations of the example processes of FIGS. 4 and 5 are hereby expressly defined to include a tangible medium such as a memory, DVD, CD, etc. Further still, the example processes of FIGS. 4 and 5 may include one or more elements, processes and/or devices in addition to, or instead of, those illustrated in FIGS. 4 and 5, and/or may include more than one of any or all of the illustrated elements, processes and devices.

FIG. 4 is a flow diagram depicting an example process of producing and sequencing a plurality of different books (block 400). Initially, an order is prepared or created (block 402) by, for example, the controller 108 of FIG. 1, which determines the sequence to produce different books. The example process discussed below in connection with FIG. 5 may be used to implement the operation(s) of block 402 to create the order. The controller 108 controls when the plurality of signature feeders 102 delivers signatures to stations 109 along the conveyor 104 (block 404). As discussed above, the different signature feeders 102 may deliver different signatures to the stations 109 associated with the same or different books. Additionally, the bindery system 100 may produce a plurality of different books in any predetermined order. The predetermined order may correspond to an order that increases the number of books that qualify for a lower postage presort level.

After the particular number of signatures (e.g., a number of signatures to produce a complete book) has been delivered to the stations 109, the stitcher 110 stitches and/or binds the plurality of signatures together to produce a book (block 406). The stitcher 110 may produce any type of stitch such as, for example, a saddle stitch or a square back stitch, as noted above.

After the books are stitched by the stitcher 110, the rejecter 112 identifies if any of the books are defective (block 408). If books are identified as defective, the controller 108 may cause a replacement for the books to be re-ordered (block 410). In some examples, if books are reordered, the plurality of signature feeders 102 may leave one or more stations 109 along the conveyor 104 empty to ensure that the predetermined order is achieved. Additionally, replacements for defective books may be re-ordered at any time and may be placed in a package of other books that have at least one of the same carrier route number, the same five digit postal code mailing address, the same first three digits of the postal code mailing address, or the same state or provincial mailing address. The type of presort level in which the re-ordered books are placed, corresponds to the amount of postal rate discounts. Further, when defective books are re-ordered, the controller 108 may change the first predetermined order to a second predetermined order to accommodate the change in production. The sequence in which the plurality of books are produced may change depending on a multitude of factors, such as, for example, the number of books that are identified as defective. The second predetermined order maximizes the number of books that qualify for the lower postage presort level.

If the books are not identified as defective, the books move toward the diverter 134. In this example, the diverter 134 diverts books towards the first trimmer conveyor 114 or the second trimmer conveyor 116 based on a characteristic of the books (block 412), such as, for example, the trim size of the books, the title of the books, or the order in which the books are sequenced within the predetermined order. The plurality of different books move towards the first trimmer 118 or the second trimmer 120. The first trimmer 118 and/or the second trimmer 120 trim the plurality of different books to a particular trim size (block 414) and may remove any rough edges and/or make all of the pages of the respective book substantially the same size.

After the books have been trimmed, the books may be personalized (block 416). Books may be personalized by any suitable method, such as, for example, the first inkjet addresser 122 and/or the second inkjet addresser may add a recipient's name and/or address on an outside cover of the books and/or at least one of a plurality of pages within the books (e.g., between the plurality of cover pages). As discussed above, in some examples, the plurality of different books may be further personalized by placing each of the different books in a polybag that may, in some examples, include additional items, such as a CD or DVD along with the books. Additionally, different polybags may be used for books with different titles and/or for books with the same title.

The books from the first trimmer conveyor 114 are merged with the books from the second trimmer conveyor 116 to form a single mail stream on the third conveyor 126 (block 418). The order that the books are placed on the third conveyor 126 may be substantially the same to the first predetermined order, the second predetermined order, or any other suitable order. The third conveyor 126 feeds the plurality of different books to the stacker 128 that stacks and/or bundles the plurality of different books (block 420) into packages, based at least in part, on the postage presort level. The bundles then move towards the pallitizer 130 that places the plurality of bundles onto pallets for shipment. The binding system 100 then determines whether it should prepare another sequence (block 422). For example, if the bindery system 100 has not received an instruction or command to stop preparing a sequence, the bindery system 100 may determine that it should prepare another sequence (block 422). Otherwise the process of FIG. 4 is ended.

FIG. 5 is a flow diagram depicting an example process that may used to implement the operation of block 402 of FIG. 4. Initially, the controller 108 identifies a plurality of different books to be produced (block 502). The different books to be produced may be differently titled periodicals, different catalogs or any other suitable bound printed material. The controller 108 also identifies the number of recipients of each book (block 504) and identifies the addresses of each of the recipients (block 506). The controller 108 combines the recipients' addresses from the first book with the addresses of the recipients from the second book to produce the predetermined order to produce and sequence the plurality of different books to co-mail (block 508). In some examples, the predetermined order substantially corresponds to an order that qualifies for a postage presort discount and maximizes the postages rate discount. Additionally, the predetermined order may be an order where substantially all of the books have the same carrier route number, the same five digit postal code mailing address, the same first three digits of the digit postal code mailing address, or the same state or provincial mailing address. The binding system 100 then determines whether it should prepare another sequence (block 510). For example, if the bindery system 100 has not received an instruction or command to stop preparing a sequence, the bindery system 100 may determine that it should prepare another sequence (block 510). Otherwise the process of FIG. 5 is ended.

Furthermore, though the examples described below detail the creation of an order for two or three different books to be mailed, any number of different books may be included as well. Consider the following example implementation of the above described processes in which two different books (e.g., Reader's Digest® and Rolling Stone® magazines) are produced on the example bindery system 100. Reader's Digest® magazines are typically a smaller size relative to Rolling Stone® magazines. The order in which these magazines are produced may correspond to the postal carrier route order, which is the order in which a mail carrier delivers these magazines to their respective recipients. For example, if the postal carrier route is associated with zip code 60606 and blocks 100-300 of South Wacker Drive and the first five addresses on the postal carrier route subscribe to the Rolling Stone® magazine, the signature feeders 102 will deliver signatures associated with the Rolling Stone® magazine to the first five stations 109 to produce five Rolling Stone® magazines. If the sixth and seventh addresses on the postal carrier route subscribe to Reader's Digest®, the signature feeders 102 will deliver signatures associated with Reader's Digest® to the sixth and seventh stations 109 to produce two Reader's Digest® magazines. If the eighth address on the postal carrier route subscribes to a Rolling Stone® magazine, the signature feeders 102 will deliver signatures associated with Rolling Stone® magazine to the eighth station 109 to produce one Rolling Stone® magazine. After all the signatures are fed onto the stations 109, the books are separated by type to different trimmers 118 and as described above. Later, the different books are merged into a predetermined order for co-mailing, as described above. If for example, the ninth address on the postal carrier route subscribes to both Reader's Digest® and Rolling Stone® magazines, the signature feeders 102 will deliver signatures associated with the Rolling Stone® magazine to the ninth station 109 and signatures associated with Reader's Digest® to the tenth station to produce one Rolling Stone® magazine and one Reader's Digest® magazine respectively. In some examples, the Rolling Stone® magazine may be produced before the Reader's Digest® so that the larger magazine (e.g., the Stone® magazine) is below the smaller magazine (e.g., R Reader's Digest®) when the different magazines are stacked. In other examples, the smaller magazine may be below the larger magazine when the different magazines are stacked, however, the different size magazines may be produced and/or stacked in any other suitable order. The quantity, the frequency, and order in which Reader's Digest® and/or Rolling Stone® magazines are produced on the example bindery system 100 is dependent on the geographic location, the number of different and/or similar magazines that an address on a postal carrier route subscribes to (e.g., 1, 2, 3, etc.) and the number of the subscribers in a given postal carrier route. Thus, the order that the magazines are produced changes depending on the carrier route for which the magazines are to be produced.

Consider another example in which, Newsweek® a popular title, and CQ Amateur Radio Magazine and Mustang Monthly less popular titles are produced on the example bindery system 100. CQ Amateur Radio Magazine and/or Mustang Monthly may have fewer subscribers in a geographic area compared to Newsweek®, and may not individually qualify for the lower postage presort level. However, by co-mailing Newsweek®, CQ Amateur Radio Magazine, and Mustang Monthly, all of the magazines may qualify for the lower presort level and, thus, qualify for postal discounts. For example, if the postal carrier route corresponds to zip code 60606 and blocks 100-300 of South Wacker Drive, Newsweek® may have 106 subscribers, CQ Amateur Radio Magazine may have three subscribers, and Mustang Monthly may have one subscriber. If the first 100 addresses on the postal carrier route subscribe to Newsweek®, the signature feeders 102 will deliver signatures associated with Newsweek® to the first 100 stations 109 to produce 100 Newsweek® magazines. If the $101^{st}$-$103^{rd}$ addresses on the postal carrier route subscribe to CQ Amateur Radio Magazine, the signature feeders 102 will deliver signatures associated with CQ Amateur Radio Magazine to the $101^{st}$-$103^{rd}$ stations 109 to produce three CQ Amateur Radio Magazine magazines. If the $104^{th}$ address on the postal carrier route subscribes to Mustang Monthly and Newsweek®, the signature feeders 102 will deliver signatures associated with Mustang Monthly to the $104^{th}$ station 109 and signatures associated with Newsweek® to the $105^{th}$ station 109 to produce one Mustang Monthly magazine and one Newsweek® magazine. If the $106^{th}$ address on the postal carrier route subscribe to Newsweek®, the signature feeders 102 will deliver signatures associated with Newsweek® to the $106^{th}$ stations 109 to produce one Newsweek® magazines. The books are divided, trimmed, and merged as described above. Also, as noted above, less popular books may be simultaneously produced and co-mailed with other books to achieve greater postal discounts.

Consider yet another example in which, Newsweek® and the Rolling Stone® magazines are produced on the example bindery system 100 and the postal carrier route is associated with zip code 60606 and blocks 100-300 of South Wacker Drive. If the postal carrier route order alternates between Newsweek® and Rolling Stone®, magazine the signature feeders 102 will deliver signatures associated with Newsweek®, for example, to every even numbered station 109 to produce a predetermined number of Newsweek® magazines and the signature feeders 102 will deliver signatures associated with Rolling Stone® magazine, for example, to every odd numbered station 109 to produce a predetermined amount of Rolling Stone® magazines. If a Rolling Stone® magazine is found to be defective, the rejecter 112 will reject the defective book and the controller 108 will order a replacement book to replace the defective book. When the replacement book is reordered, the predetermined order will change to accommodate producing the replacement book, such that, instead of alternating between producing a Newsweek® and a Rolling Stone® magazine, the signature feeders 102 will deliver signatures associated with Rolling Stone® magazine to two stations 109 to produce two Rolling Stone® magazines one of which is the replacement book. In some examples, after a replacement book is reordered, to achieve the postage rate discount, some stations 109 are left empty, and/or some of the Newsweek® and the Rolling Stone® magazines are held at the end of the first and second trimmer conveyors 114 and 116 prior to merging to a single mail stream on the third conveyor 126 so the replacement book is properly sequenced.

Figure 6:
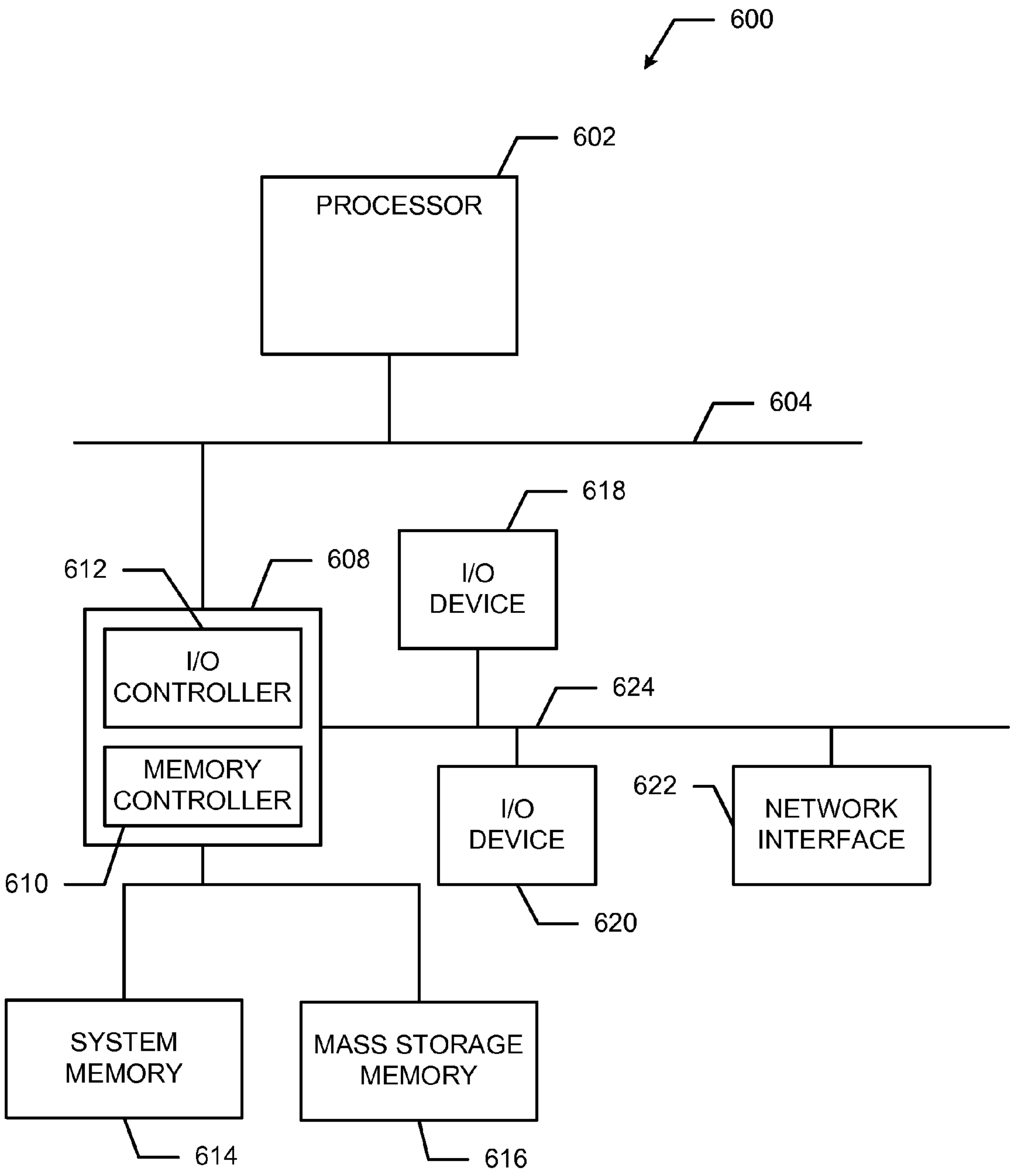
FIG. 6 illustrates an example system to implement the controller of FIG.

FIG. 6 is a block diagram of an example processor system 600 that may be used to implement the apparatus and methods described herein. As shown in FIG. 6, the processor system 600 includes a processor 602 that is coupled to an interconnection bus 604. The processor 602 may be any suitable processor, processing unit or microprocessor. Although not shown in FIG. 6, the system 600 may be a multi-processor system and, thus, may include one or more additional processors that are identical or similar to the processor 602 and that are communicatively coupled to the interconnection bus 604.

The processor 602 of FIG. 6 is coupled to a chipset 608, which includes a memory controller 620 and an input/output (I/O) controller 612. As is well known, a chipset typically provides I/O and memory management functions as well as a plurality of general purpose and/or special purpose registers, timers, etc. that are accessible or used by one or more processors coupled to the chipset 608. The memory controller 610 performs functions that enable the processor 602 (or processors if there are multiple processors) to access a system memory 2614 and a mass storage memory 616.

The system memory 614 may include any desired type of volatile and/or non-volatile memory such as, for example, static random access memory (SRAM), dynamic random access memory (DRAM), flash memory, read-only memory (ROM), etc. The mass storage memory 616 may include any desired type of mass storage device including hard disk drives, optical drives, tape storage devices, etc.

The I/O controller 612 performs functions that enable the processor 602 to communicate with peripheral input/output (I/O) devices 618 and 620 and a network interface 622 via an I/O bus 624. The I/O devices 618 and 620 may be any desired type of I/O device such as, for example, a keyboard, a video display or monitor, a mouse, etc. The network interface 622 may be, for example, an Ethernet device, an asynchronous transfer mode (ATM) device, an 802.11 device, a DSL modem, a cable modem, a cellular modem, etc. that enables the processor system 600 to communicate with another processor system.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A system to produce and sequence a plurality of different books comprising:

a plurality of signature feeders to deliver signatures to a plurality of stations along a conveyor to simultaneously produce and sequence a plurality of different books in a first predetermined order to co-mail, wherein the different books comprise a first book and a second book, the second book having a different trim size than the first book, wherein one or more of the signature feeders is to deliver signatures having a first trim size and associated with the first book and one or more of the signature feeders is to deliver signatures having a second trim size and associated with the second book;

a diverter to divert the first book to a first trimmer and the second book to a second trimmer, the trimmers to trim the books;

a stacker to stack the books in a second predetermined order, wherein the second predetermined order satisfies discount postage rate guidelines; and a controller to cause the plurality of different books to be produced in the first predetermined order.

2. The system as defined in claim 1, wherein the first predetermined order and the second predetermined order are the same.

3. The system as defined in claim 1, wherein the controller is communicatively coupled to at least one of the plurality of signature feeders, the trimmers, or the stacker.

4. The system as defined in claim 1, wherein the controller is to cause the plurality of signature feeders to leave one of the plurality of stations along the conveyor empty.

5. The system as defined in claim 1, further comprising a rejecter to reject a defective book.

6. The system as defined in claim 5, wherein the controller is to cause a replacement book for the defective book to be reordered along the conveyor.

7. The system as defined in claim 6, wherein the defective book is included in a bundle of other books with at least one of the same carrier route number, the same five digit postal code mailing address, the same first three digits of the postal code mailing address, or the same state mailing address.

8. The system as defined in claim 5, further comprising a change of the first predetermined order.

9. The system as defined in claim 1, wherein at least one of the signatures is personalized as the plurality of different books is produced.

10. The system as defined in claim 1, wherein the first and second predetermined orders are determined prior to producing the books.

11. The system as defined in claim 1, wherein the controller is to maximize a postage rate discount.

12. The system as defined in claim 1, further comprising a binder to produce different bindings for the plurality of different books.

13. The system as defined in claim 12, wherein the bindings include at least one of a saddle stitch or a square back stitch.

14. A method of simultaneously producing and sequencing different books on a binding line, each of the different books having different content, comprising:

delivering a plurality of signatures to a plurality of stations along a conveyor in a first predetermined order, wherein the first predetermined order is to co-mail the books to obtain postage discounts;

binding the plurality of signatures to produce the different books using a binder, wherein one or more of the books comprise a different width or height;

diverting the books to a trimmer associated with the respective width or height of the book;

trimming the books using the trimmer associated with the respective width or height of the book; and stacking the books in a second predetermined order.

15. The method as defined in claim 14, wherein the first predetermined order and the second predetermined order are different.

16. The method as defined in claim 14, further comprising rejecting a defective one of the books.

17. The method as defined in claim 16, further comprising re-ordering a replacement book for the defective one of the books.

18. The method as defined in claim 14, further comprising changing the first predetermined order in which the plurality of signature feeders delivers the plurality of signatures to stations along a conveyor.

19. The method as defined in claim 14, further comprising leaving an empty space on one of the plurality of stations along the conveyor belt.

20. The method as defined in claim 14, further comprising customizing at least one of the different books.

21. The method as defined in claim 14, further comprising maximizing a postage rate discount.

22. A system to produce and sequence a plurality of different books comprising:

means for simultaneously producing and sequencing first and second books in a predetermined order to co-mail, wherein one or more of the books comprise a different trim size;

first signature feeders to deliver signatures having a first trim size and associated with the first book and second signature feeders to deliver signatures having a second trim size and associated with the second book;

means for trimming the first books associated with the first trim size and second books associated with the second trim size different than the first trim size; and means for satisfying discount postage rate guidelines.

23. The system as defined in claim 22, further comprising means for controlling the means for simultaneously producing and sequencing the plurality of different books in the predetermined order.

24. The system as defined in claim 22, further comprising means for rejecting a defective book.

25. The system as defined in claim 24, further comprising means for re-ordering the defective book.

26. The system as defined in claim 22, further comprising means for changing the predetermined order.

27. The system as defined in claim 22, further comprising means for maximizing a postage discount rate.

28. The system as defined in claim 1, wherein the first book comprises at least one of a first width or height and the second book comprises at least one of a second width or height different from the at least one of the first width or height.

29. A system to produce and sequence a plurality of books comprising:

a plurality of signature feeders to deliver signatures to a plurality of stations along a conveyor to simultaneously produce and sequence a plurality of books in a first predetermined order to co-mail, a first trimmer to trim first books;

a second trimmer to trim second books;

a diverter to divert the first books to the first trimmer and the second books to the second trimmer;

a stacker to stack the books in a second predetermined order, wherein the second predetermined order satisfies discount postage rate guidelines; and a controller to cause the books to be produced in the first predetermined order.

30. The system of claim 29, wherein the first books comprise a first trim size and the second books comprise a second trim size.

31. The system of claim 29, wherein the diverter is to be upstream from the first and second trimmers.

* * * * *